United States Patent
Tsao et al.

(10) Patent No.: US 8,406,325 B2
(45) Date of Patent: Mar. 26, 2013

(54) METHODS AND RECEIVERS OF CARRIER FREQUENCY OFFSET DETECTION

(75) Inventors: Hen-Wai Tsao, Tsao (TW); Yang-Han Lee, Taipei (TW); Yu-Lin Shiao, Taipei (TW); Jing-Shown Wu, Taipei (TW)

(73) Assignee: National Taiwan University, Taipei (TW)

( * ) Notice: Subject to any disclaimer, the term of this patent is extended or adjusted under 35 U.S.C. 154(b) by 537 days.

(21) Appl. No.: 12/713,156

(22) Filed: Feb. 25, 2010

(65) Prior Publication Data

US 2011/0051830 A1    Mar. 3, 2011

(30) Foreign Application Priority Data

Sep. 2, 2009   (TW) ................. 98129516 A

(51) Int. Cl.
*H04K 1/10* (2006.01)
(52) U.S. Cl. ........ 375/260; 375/267; 375/299; 375/347; 375/349
(58) Field of Classification Search .................. 375/260, 375/267, 299, 347, 349
See application file for complete search history.

(56) References Cited

U.S. PATENT DOCUMENTS

| 2006/0104254 A1* | 5/2006 | Shin et al. ............... 370/343 |
| 2006/0233270 A1* | 10/2006 | Ahn et al. ............... 375/260 |
| 2008/0159430 A1* | 7/2008 | Steer et al. ............... 375/267 |

* cited by examiner

*Primary Examiner* — Kabir A Timory
(74) *Attorney, Agent, or Firm* — Wang Law Firm, Inc.; Li K. Wang; Stephen Hsu

(57) ABSTRACT

A receiver used for an orthogonal frequency-division multiplexing (OFDM) system is provided. A signal processing device receives an OFDM symbol and processes the OFDM symbol according to the OFDM symbol and a carrier frequency offset compensation coefficient to generate a processed signal. The OFDM symbol includes pilots which have been hierarchically modulated and the processed signal includes the processed pilots. A signal analysis device collects the processed pilots of the processed signal and detects carrier frequency offset to generate the carrier frequency offset compensation coefficient to the signal processing device according to the processed pilots and a plurality of target decision bit error rates. A channel detection module detects a channel response of the processed signal according to the processed pilots and compensates the processed signal to generate an output data.

35 Claims, 13 Drawing Sheets

METHODS AND RECEIVERS OF CARRIER FREQUENCY OFFSET DETECTION

CROSS REFERENCE TO RELATED APPLICATIONS

This application claims priority of Taiwan Patent Application No. 098129516 filed on Sep. 2, 2009, the entirety of which is incorporated by reference herein.

BACKGROUND OF THE INVENTION

1. Field of the Invention

The invention relates to carrier frequency offset detection, and more particularly, to methods and receivers using the hierarchical modulated pilots to detect carrier frequency offset, applied in orthogonal frequency division multiplexing systems.

2. Description of the Related Art

Recently, the application of orthogonal frequency division multiplexing system has become the most important wireless communication technology. Data can be easily and efficiently transmitted and received in the wireless communication environment because of the high transmission rate of the orthogonal frequency division multiplexing system. Therefore, orthogonal frequency division multiplexing scheme is applied to, for example, Digital Audio Broadcasting (DAB), Digital Video Broadcasting-Terrestrial/Handheld (DVB-T/H), Wireless Fidelity (Wi-Fi) and Worldwide Interoperability for Microwave Access (WiMAX) etc., and the orthogonal frequency division multiplexing scheme is regarded as the 4th-Generation Wireless System.

The data is transmitted by a plurality of sub-carriers which overlap and are orthogonal to each other in the orthogonal frequency division multiplexing system. In addition, duplicated data which is copied from the end of the symbol is defined as a cyclic prefix (CP) or a guard interval (GI), and the purpose of the duplicated data is to protect the orthogonal frequency division multiplexing symbol from inter-symbol interference (ISI) generated by multi-path fading and reflection in the channels. The bandwidth used by the orthogonal frequency division multiplexing system is divided into a number of sub-bands, and the sub-bands are only affected by the flat fading. Thus, the receiver only needs one simple equalizer to adjust signal gain and compensate for the flat fading of the channel. The orthogonal frequency division multiplexing system has many advantages such as an advantage against multi-path fading, high-efficiency bandwidth, low-complexity equalizer and high transmission rate.

However, the orthogonal frequency division multiplexing system is affected by the Doppler effect in the high speed movement condition such as high speed rail. The orthogonal frequency division multiplexing system which is regarded as a multi-carrier system is very sensitive to carrier frequency offset (CFO) caused by Doppler effect. The carrier frequency offset will destroy the orthogonality between the sub-carriers and generate inter-carrier interference (ICI) between the sub-carriers such that the performance of the orthogonal frequency division multiplexing system in the environment of the high speed decreases and the bit error rate increases. Therefore, how to detect carrier frequency offset (CFO) to cancel inter-carrier interference (ICI) between the sub-carriers is the most important subject to realize the orthogonal frequency division multiplexing system.

BRIEF SUMMARY OF THE INVENTION

One objective of the invention is to provide a receiver used for an orthogonal frequency-division multiplexing (OFDM) system, comprising: a signal processing device receiving an OFDM symbol and processing the OFDM symbol according to the OFDM symbol and a carrier frequency offset compensation coefficient to generate a processed signal, wherein the OFDM symbol comprises pilots which have been hierarchically modulated and the processed signal comprises processed pilots; a signal analysis device collecting the processed pilots of the processed signal and detecting a carrier frequency offset to generate the carrier frequency offset compensation coefficient to the signal processing device according to the processed pilots and a plurality of target decision bit error rates; and a channel detection module detecting a channel response of the processed signal according to the processed pilots and compensating the processed signal to generate an output data.

Another objective of the invention is to provide a method of carrier frequency offset detection used for an orthogonal frequency-division multiplexing (OFDM) system, comprising: modulating a plurality of pilots in an OFDM symbol hierarchically; transmitting the OFDM symbol, wherein the OFDM symbol is affected by a carrier frequency offset; processing the OFDM symbol according to the OFDM symbol and a carrier frequency offset compensation coefficient to generate a processed signal by a signal processing device, wherein the processed signal having the processed pilots; collecting the processed pilots of the processed signal; demodulating the processed pilots; and detecting carrier frequency offset to generate the carrier frequency offset compensation coefficient to the signal processing device according to the demodulated processed pilots and a plurality of target decision bit error rates.

The advantage and spirit of the invention could be better understood by the following recitations together with the appended drawings.

BRIEF DESCRIPTION OF DRAWINGS

The invention can be more fully understood by reading the subsequent detailed description and examples with references made to the accompanying drawings, wherein:

FIG. 2-1 is a schematic diagram illustrating a hierarchical 64-QAM constellation and a number of gray codes corresponding to a hierarchical 64-QAM constellation according to an embodiment of the invention.

FIG. 2-2 is a schematic diagram illustrating the hierarchical 64-QAM constellation corresponding to the FIG. 2-1 according to an embodiment of the invention.

FIG. 2-3 is a schematic diagram illustrating a uniform hierarchical 64-QAM constellation if $\lambda_1=2$ and $\lambda_2=1$.

FIG. 2-4 is a schematic diagram illustrating a uniform hierarchical 64-QAM constellation if $\lambda_1=1.9$, $\lambda_2=1.1$.

FIG. 2-5 is a schematic diagram illustrating a uniform hierarchical 64-QAM constellation if $\lambda_1=1.8$, $\lambda_2=1.2$.

FIG. 2-6 is a schematic diagram illustrating a uniform hierarchical 64-QAM constellation if $\lambda_1=1.6$, $\lambda_2=1.4$.

FIG. 3 is a block diagram illustrating a receiver 200 according to an embodiment of the invention.

FIG. 4-1 is a performance diagram of each hierarchical bit error rate using a uniform hierarchical 64-QAM constellation according to an embodiment of the invention, wherein $\lambda_1$ is 2 and $\lambda_2$ is 1 in the uniform hierarchical 64-QAM constellation, and the vertical axis represents bit error rate (BER), the first horizontal axis represents the signal and noise ratio (SNR), and the second horizontal axis represents the normalized frequency offset.

FIG. 4-2 is a performance diagram of each hierarchical bit error rate using a non-uniform hierarchical 64-QAM constellation according to an embodiment of the invention, wherein $\lambda_1$ is 1.6 and $\lambda_2$ is 1.4 in the non-uniform hierarchical 64-QAM constellation, and the vertical axis represents bit error rate (BER), the first horizontal axis represents the signal and noise ratio (SNR), and the second horizontal axis represents the normalized frequency offset.

FIG. 5 is flow chart showing the detection of the signal and noise ratio (SNR) according to an embodiment of the invention, wherein $\lambda_1$ is 1.6 and $\lambda_2$ is 1.4 in the non-uniform hierarchical 64-QAM constellation.

FIGS. 6-1, 6-2, 6-3, 6-4 and 6-5 are the performance curves of bit error rate of each level according to an embodiment of the invention, wherein $\lambda_1$ is 1.6 and $\lambda_2$ is 1.4 in the non-uniform hierarchical 64-QAM constellation and the normalized frequency offset is 0.001, 0.01, 0.05, 0.1 and 0.15 in the FIGS. 6-1, 6-2, 6-3, 6-4 and 6-5 respectively.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
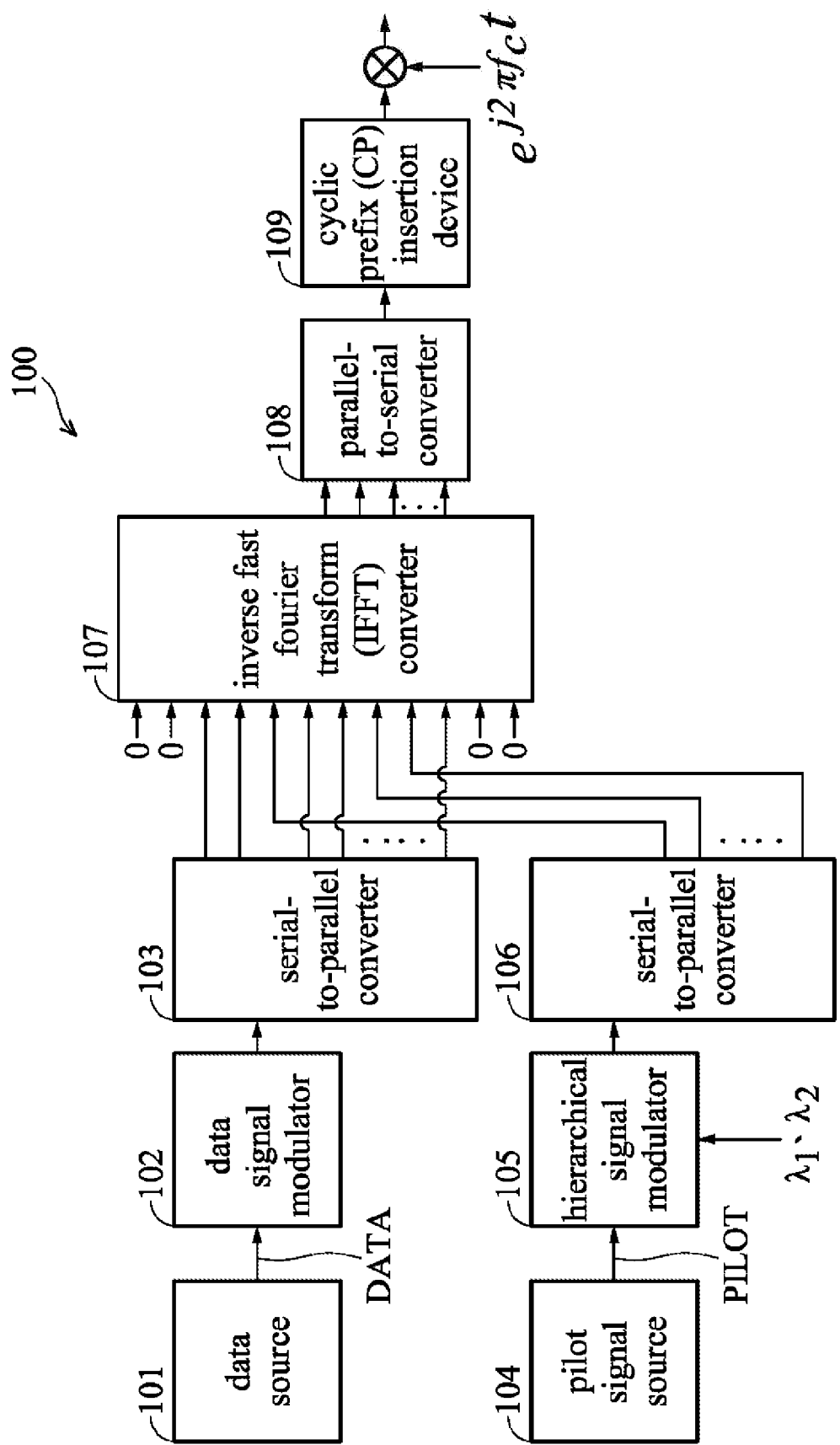
FIG. 1 is a block diagram illustrating a transmitter 100 for generating and transmitting an Orthogonal Frequency Division Multiplexing (OFDM) symbol which has pilots which have been hierarchically modulated according to an embodiment of the invention.

FIG. 1 is a block diagram illustrating a transmitter 100 for generating and transmitting an Orthogonal Frequency Division Multiplexing (OFDM) symbol which has pilots which have been hierarchically modulated according to an embodiment of the invention. The receiver 100 may comprise a data source 101 for generating and outputting the digital data bits DATA to a data signal modulator 102. The data signal modulator 102 is configured to modulate the received digital data bits DATA. For example, the received digital data bits DATA are modulated to generate the modulated in-phase/quadrature-phase data signal by using binary phase shift keying (BPSK), quadrature phase shift keying (QPSK) or quadrature amplitude modulation (QAM) such as 16-QAM, 64-QAM and 128-QAM etc. A serial-to-parallel converter 103 will convert the serial modulated in-phase/quadrature-phase data signal into the parallel modulated in-phase/quadrature-phase data signal, and the parallel modulated in-phase/quadrature-phase data signal passed by the serial-to-parallel 103 is outputted to an inverse fast fourier transform (IFFT) converter 107 which has N-points inverse fast fourier transform (IFFT). At the same time, a pilot signal source 104 generates and outputs a number of pilot signals PILOT to a hierarchical signal modulator 105. The hierarchical signal modulator 105 is configured to modulate the received pilot signals PILOT by using a uniform hierarchical quadrature amplitude modulation (QAM) constellation. In this embodiment of the invention, the pilot signals PILOT are modulated to generate the modulated in-phase/quadrature-phase pilot signals by using an uniform hierarchical 64-QAM constellation or uniform hierarchical 256-QAM constellation but not using a general modulation scheme such as BPSK or QPSK etc. The hierarchical signal modulator 105 adjusts a distribution of the constellation points in the hierarchical 64-QAM constellation according to two hierarchical level distance ratios and the hierarchical signal modulator 105 outputs the modulated in-phase/quadrature-phase pilot signals to a serial-to-parallel converter 106. The parallel modulated in-phase/quadrature-phase pilot signals passed by the serial-to-parallel 106 are outputted to the inverse fast fourier transform (IFFT) converter 107. The modulated in-phase/quadrature-phase pilot signals and the modulated in-phase/quadrature-phase data signal are transformed from the time domain to the frequency domain by the inverse fast fourier transform (IFFT) converter 107, and a number of symbols are outputted and transferred from parallel form to serial form by a parallel-to-serial converter 108. Finally, a guard interval (GI) which is a copied section from the end of the symbol is added to the number of symbols to generate and transmit the OFDM symbols by a cyclic prefix (CP) insertion device 109. Adding the guard interval (GI) to the head of the symbol can maintain the continuity of the OFDM symbols. For example, the guard interval (GI) is one half of the OFDM symbols length or the eighteenth of the OFDM symbols length. Adding the guard interval (GI) can protect the OFDM symbols from inter-symbol interference (ISI) generated by multi-path fading and reflection in the channels. In the transmitting procedure, the Doppler effect is generated due to high speed movement. A parameter affected by Doppler effect is a multiplicator shown in the FIG. 1 and the multiplicator is also shown as the carrier frequency offset (CFO) caused by Doppler effect.

Figure 2:
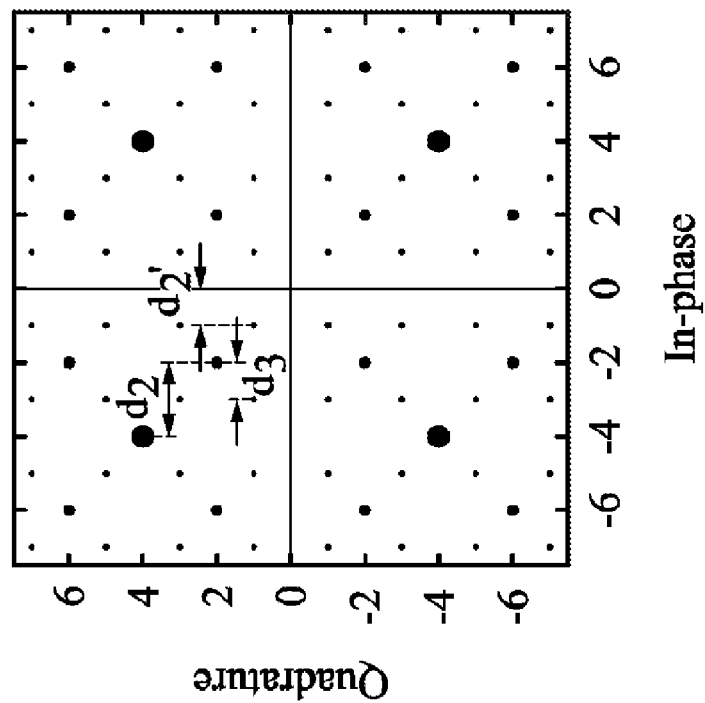
Figures 1, 2:
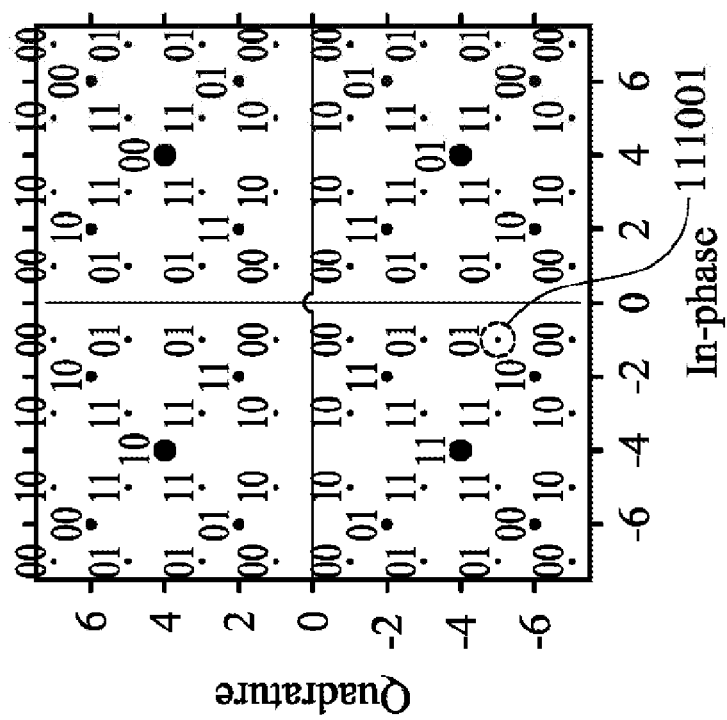

FIG. 2-1 is a schematic diagram illustrating a hierarchical 64-QAM constellation and a number of gray codes corresponding to hierarchical 64-QAM constellation according to an embodiment of the invention. As shown in the FIG. 1, the hierarchical signal modulator 105 modulates the received pilot signals to generate the modulated I/Q pilot signals by using hierarchical modulation. In hierarchical modulation, the modulated I/Q pilot signals corresponding to the received pilot signals are found according to hierarchical 64-QAM constellation.

There are three hierarchical bits in the hierarchical 64-QAM constellation shown in the FIG. 2-1. The biggest point shown in the FIG. 2-1 is determined by the first hierarchical bits. In other words, the two level bits in the first level jointly determine the biggest point as QPSK in FIG. 2-1. By the same way, a middle point shown in the FIG. 2-1 is determined by the two level bits of the second level, and a smallest point shown in the FIG. 2-1 is determined by the two level bits of the third level bits. For example, a binary digit sequence 111001 is generated by the pilot signal source 104. Using FIG. 2-1 as an example, the constellation points corresponding to the binary digit sequence 111001 is obtained by the hierarchical 64-QAM constellation. The biggest point at the upper-left corner of the hierarchical 64-QAM constellation is obtained according to the first level which has two level bits 11, the middle point at the lower-right corner of the selected biggest point is obtained according to the second level which has two level bits 10 and the selected biggest point, and the smallest point at upper-right corner of the selected middle point is obtained according to the third level which has two level bits 01 and the selected middle point. In order to generate I/Q pilot signals corresponding to the pilot signals, the constellation points corresponding to the sequence 111001 is determined in FIG. 2-1 according to the above steps. Demodulation is a reverse procedure of the modulation. The received I/Q pilot signal is mapped to the constellation points in the hierarchical 64-QAM constellation, and then a gray code corresponding to one of the constellation points is obtained. Thus, the three levels, one of which has its own level bits, am obtained according to the gray code.

Figures 2, 3, 4:
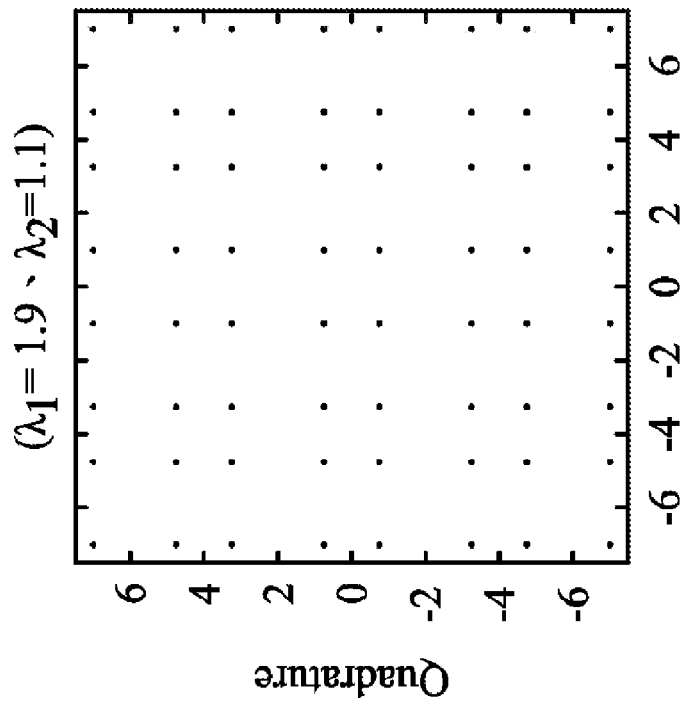
Figures 2, 3:
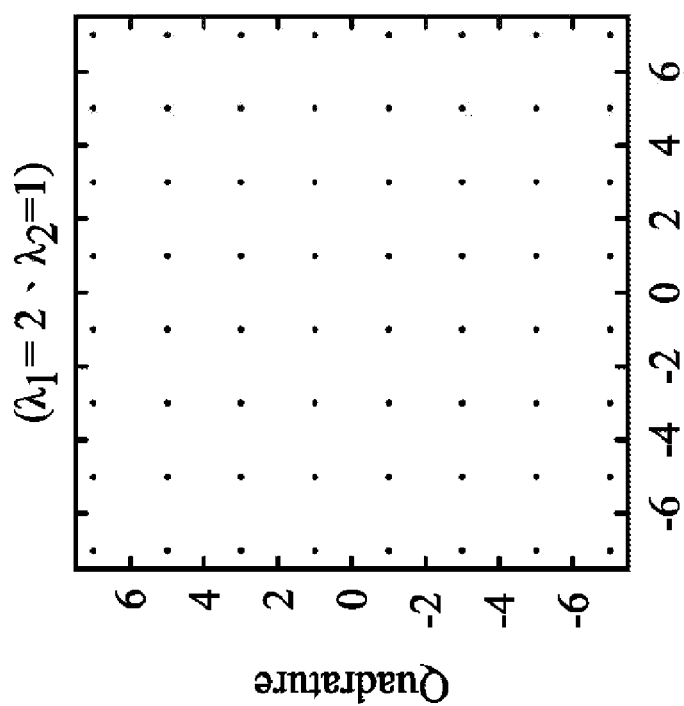

FIG. 2-2 is a schematic diagram illustrating the hierarchical 64-QAM constellation as shown in FIG. 2-1 according to an embodiment of the invention. The parameters $d_2'$, $d_2$, $d_3$ represent the distance between the constellation points in the hierarchical 64-QAM constellation respectively, wherein the parameter $d_2$ represents the x-axis distance between the constellation point of the first level (the biggest point) and the constellation point of the second level (the middle point) as shown in the FIG. 2-2, the parameter $d_3$ represents the x-axis distance between the constellation point of the second level (the middle point) and the constellation point of the second level (the smallest point) as shown in the FIG. 2-2 and the parameter $d_2'$ represents the x-axis distance between the y-axis and the constellation point of the third level which is closest to the y-axis (the smallest point) as shown in the FIG. 2-2. The parameters $\lambda_1$ and $\lambda_2$ are defined as hierarchical level distance ratios, where $\lambda_1 = d_2/d_2'$, $\lambda_2 = d_3/d_2'$. The distribution of a plurality of constellation points in the hierarchical 64-QAM constellation is changed if the two hierarchical level distance ratios are adjusted. FIG. 2-3 is a schematic diagram illustrating a uniform hierarchical 64-QAM constellation if $\lambda_1 = 2$ and $\lambda_2 = 1$ and FIG. 2-4, FIG. 2-5 and FIG. 2-6 are a schematic diagram illustrating a non-uniform hierarchical 64-QAM constellation if $\lambda_1 = 1.9$, $\lambda_2 = 1.1$ (shown as FIG. 2-4), $\lambda_1 = 1.8$, $\lambda_2 = 1.2$ (shown as FIG. 2-5), $\lambda_1 = 1.6$, $\lambda_2 = 1.4$ (shown as FIG. 2-6) respectively. The hierarchical 64-QAM constellation has a plurality of constellation points which present a non-uniform distribution according FIG. 2-4, FIG. 2-5 and FIG. 2-6. The distribution of the constellation points in the hierarchical 64-QAM constellation is controlled by the two hierarchical level distance ratios $\lambda_1$ and $\lambda_2$. The bit error rate corresponding to each level in the uniform hierarchical 64-QAM constellation is not influenced by the carrier frequency offset (CFO). However, in the non-uniform hierarchical 64-QAM constellation, each bit error rate has different characteristics in response to the carrier frequency offset. Therefore, signal to noise ratio (SNR) is first detected by using the non-uniform hierarchical QAM constellation, and then carrier frequency offset (CFO) caused by high speed movement is detected.

FIG. 3 is a block diagram illustrating a receiver 200 according to an embodiment of the invention. The receiver 200 is configured for receiving an OFDM symbol affected by carrier frequency offset (CFO), and detecting and compensating the carrier frequency offset using the hierarchically modulated pilots. The functional blocks in the receiver 200 are the inverse of the functional blocks in the transmitter 100 to demodulate the signals. The receiver 200 in the FIG. 3 comprises a signal processing device 201 for receiving an OFDM symbol and processing the OFDM symbol according to the OFDM symbol and a carrier frequency offset compensation coefficient to generate a processed signal, wherein the OFDM symbol has pilots which have been hierarchically modulated, and the processed signal having the processed pilots. The signal processing device 201 comprises a cyclic prefix (CP) removal device 2011 for removing the added guard interval (GI) in the transmitter 100. A serial-to-parallel converter 2012 is configured to transfer the symbols from serial form to parallel form. The symbols are transformed from the frequency domain to the time domain by the fast fourier transform (FFT) converter 2013 and the fast fourier transform (FFT) converter 2013 outputs the I/Q data signals and the I/Q pilot signals. A parallel-to-serial converter 2014 is configured to convert the I/Q data signals and the I/Q pilot signals from parallel form to serial form, wherein the I/Q data signals and the I/Q pilot signals are defined as the processed signals. The receiver 200 in the FIG. 3 further comprises a signal analysis device 20. The signal analysis device 20 comprises a pilot signal collector 202 for collecting the I/Q pilot signals of the I/Q data signals and the I/Q pilot signals outputted by the parallel-to-serial converter 2014. A hierarchical pilot signal demodulator 203 for demodulating the I/Q pilot signals in the OFDM symbols and outputting a number of pilots. Using the hierarchical 64-QAM constellation as an example, each of the I/Q pilot signals in the OFDM symbols demodulated by the hierarchical pilot signal demodulator 203 can represent six bits, wherein the first level comprises the first and second bits, the second level comprises the third and fourth bits, and the third level comprises the fifth and sixth bits. Furthermore, the level bits in each level are inputted to a pilot signal analysis module 204. In order to detect the signal and noise ratio (SNR) which represents the channel quality, the pilot signal analysis module 204 determines an order of bit error rates corresponding to all levels in a certain signal and noise ratio (SNR) according to the demodulated processed pilots. The signal and noise ratio (SNR) is detected using received signal strength indication (RSSI), which is a conventional method. High SNR and good communication is determined by the pilot signal analysis module 204 when the signal and noise ratio exceeds the predetermined value, 20 dB as an example. Further, carrier frequency offset is detected by the pilot signal analysis module 204 to generate the carrier frequency offset compensation coefficient CC. A channel detection module 205 is configured for detecting channel responses according to the collected I/Q pilot signals and compensating the channel responses. The I/Q data signals are demodulated into digital data bits DATA by the channel detection module 205. The channel detection module 205 comprises a channel estimator 2051 for detecting channel responses according to the collected I/Q pilot signals and a one-tap equalizer 2052 for compensating the channel response according to the detected channel responses to compensate the effect by the channel fading in order to prevent the transmitted signals from the terrible distortion. A data signal demodulator 2053 transforms I/Q data signals to the digital data bits DATA.

FIG. 4-1 is a performance diagram of bit error rate at each level using a uniform hierarchical 64-QAM constellation according to an embodiment of the invention, wherein $\lambda_1$ is 2 and $\lambda_2$ is 1 in the uniform hierarchical 64-QAM constellation, and the vertical axis represents bit error rate (BER), the first horizontal axis represents the signal and noise ratio (SNR), and the second horizontal axis represents the normalized frequency offset. The bit error rate of each level in the uniform hierarchical 64-QAM constellation does not follow the normalized frequency offset change as shown in FIG. 4-1. No matter what the normalized frequency offset is 0.001, 0.01, 0.05, 0.1 or 0.15, bit error rates in sequence always are: bit error rate of the first level, bit error rate of the second level, bit error rate of the third level (from larger bit error rates to small rates). The error floor of level bit in each level also does not follow the normalized frequency offset of change, wherein the representation of the error floor means that the effect of bit error rate by ICI which is caused by the normalized frequency offset is not large when the signal and noise ratio (SNR) is low and bit error rate affected by the normalized frequency offset does not follow the increasing signal and noise ratio and decrease when the signal and noise ratio (SNR) is high. For example, none of the bit error rates of the first level, second level or third level decrease in response to the increasing signal and noise ratio when the normalized frequency offset is 1.5 as shown in the FIG. 4-1. The error floor also means that the bit error rate can not decrease in response to an increase in the signal and noise ratio.

FIG. 4-2 is a performance diagram of the bit error rate of each level by using a non-uniform hierarchical 64-QAM constellation according to an embodiment of the invention, wherein $\lambda_1$ is 1.6 and $\lambda_2$ is 1.4 in the non-uniform hierarchical 64-QAM constellation, and the vertical axis represents bit error rate (BER), the first horizontal axis represents the signal and noise ratio (SNR), and the second horizontal axis represents the normalized frequency offset. However, in the non-uniform hierarchical 64-QAM constellation, bit error rate corresponding to each level is different. In other words, the hierarchical modulation will cause each level to have a different degree of protection. The bit error rate of the third level will become the highest bit error rate when the normalized frequency offset is 0 and the signal and noise ratio (SNR) is smaller than 10 dB. The above condition means that the protection ability of the third level is the lowest, protection ability of the second level is middle and protection ability of the first level is the highest (the bit error rate of the first level is the lowest). When the signal and noise ratio (SNR) is between 10~17 dB, the bit error rate from high to low is: the second level, the third level, and the first level and the protection ability from high to low is: the first level, the third level, and the second level. When the signal and noise ratio (SNR) is larger than 17 dB, the bit error rate from high to low is: the second level, the first level, and the third level, and the protection ability from high to low is: the third level, the first level, and the second level. When the normalized frequency offset is 0.01, only the second level has different protection ability. The bit error rate of the second level in the high signal and noise ratio (SNR) has the phenomenon of the error floor as shown in the FIG. 4-2. In other words, the carrier frequency offset will cause the bit error rate of the second level to not follow the increasing signal and noise ratio as it decreases. The bit error rate of the second level is increasing when the normalized frequency offset is 0.05. The protection ability of the first level is larger than the protection ability of the third level when the normalized frequency offset is 0.1 and the signal and noise ratio (SNR) is below 20 dB. However, the protection ability of the first level is smaller than the third level when the signal and noise ratio (SNR) is larger than 20 dB. This characteristic is regarded as the method for determining the signal and noise ratio (SNR). The phenomenon of the error floor happens when the bit error rate of the first level is $4 \cdot 10^{-4}$ and the bit error rate of the third level is $2 \cdot 10^{-5}$ is higher than the signal and noise ratio (SNR). Therefore, the error floor in each level occurs and the order of the protection ability for each level change is changed by the carrier frequency offset. The flow chart is designed for detecting the signal and noise ratio (SNR) in the embodiment of the invention (as shown in the FIG. 5).

Figures 2, 3, 4, 5, 6:
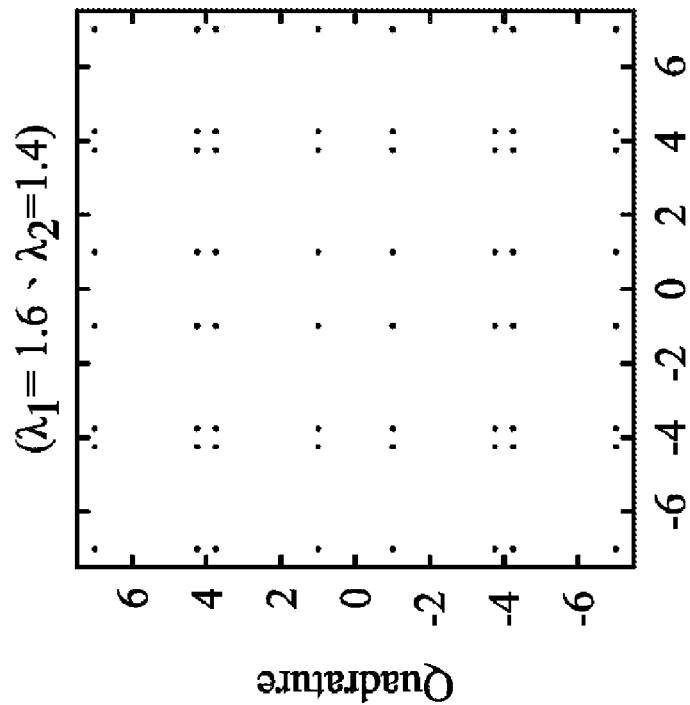
Figures 2, 3, 4, 5:
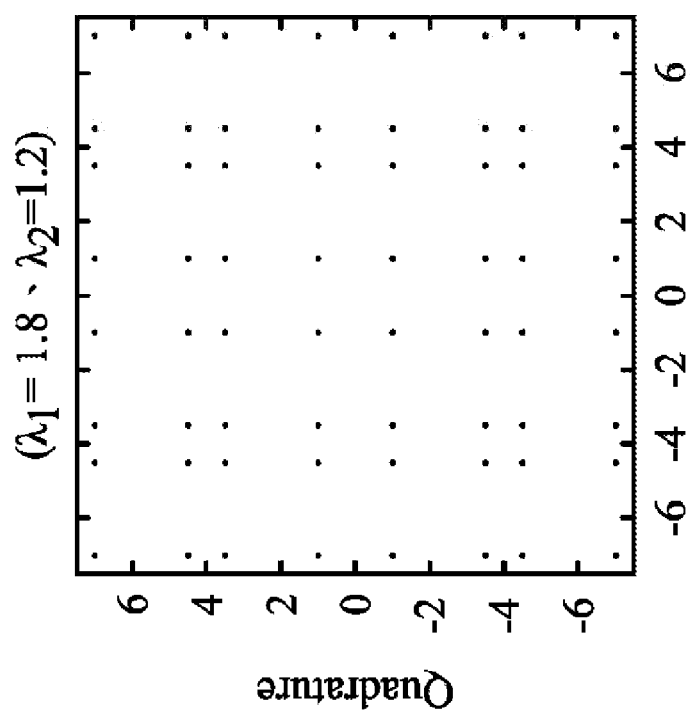
Figure 3:
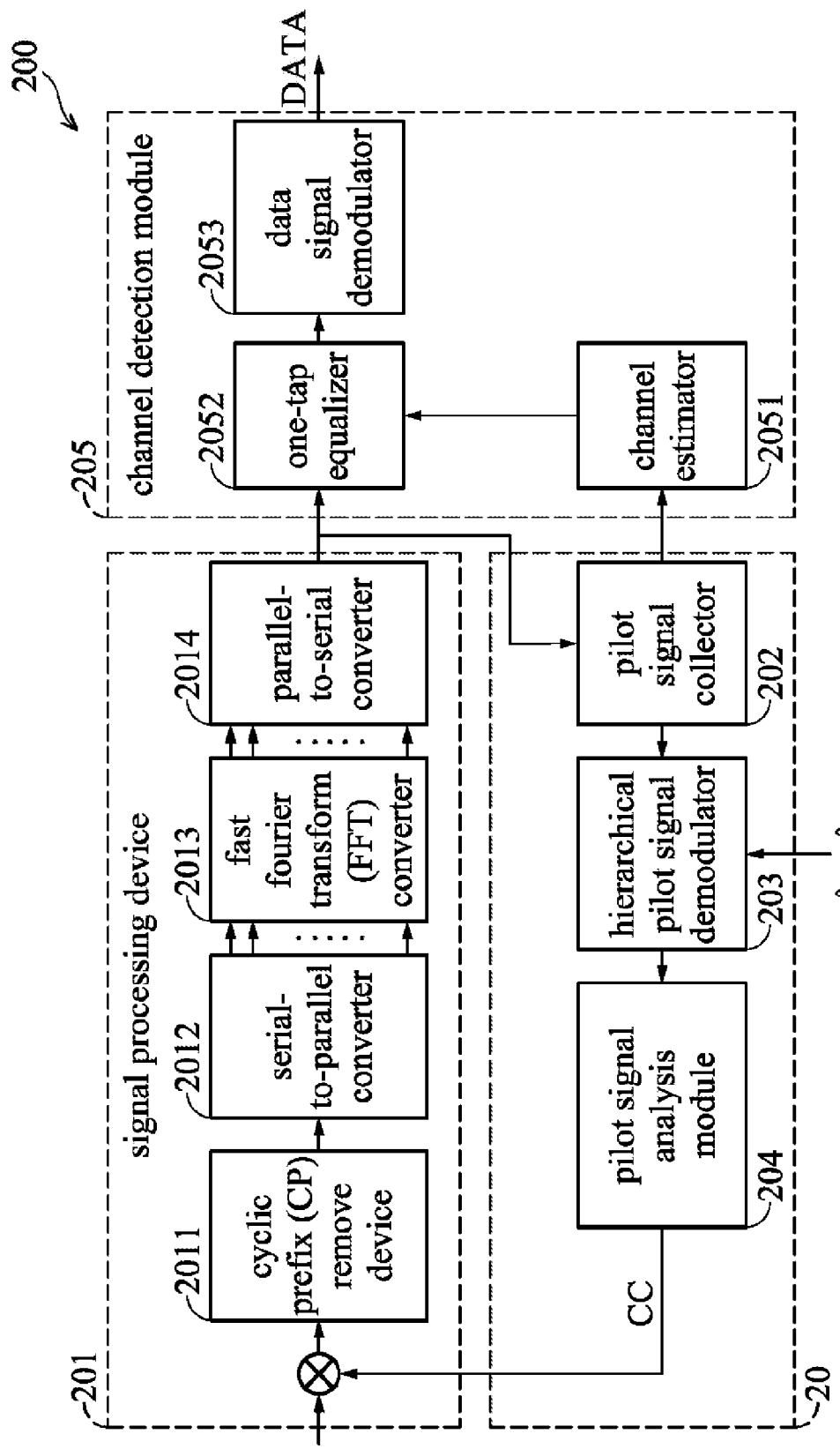
Figures 1, 4:
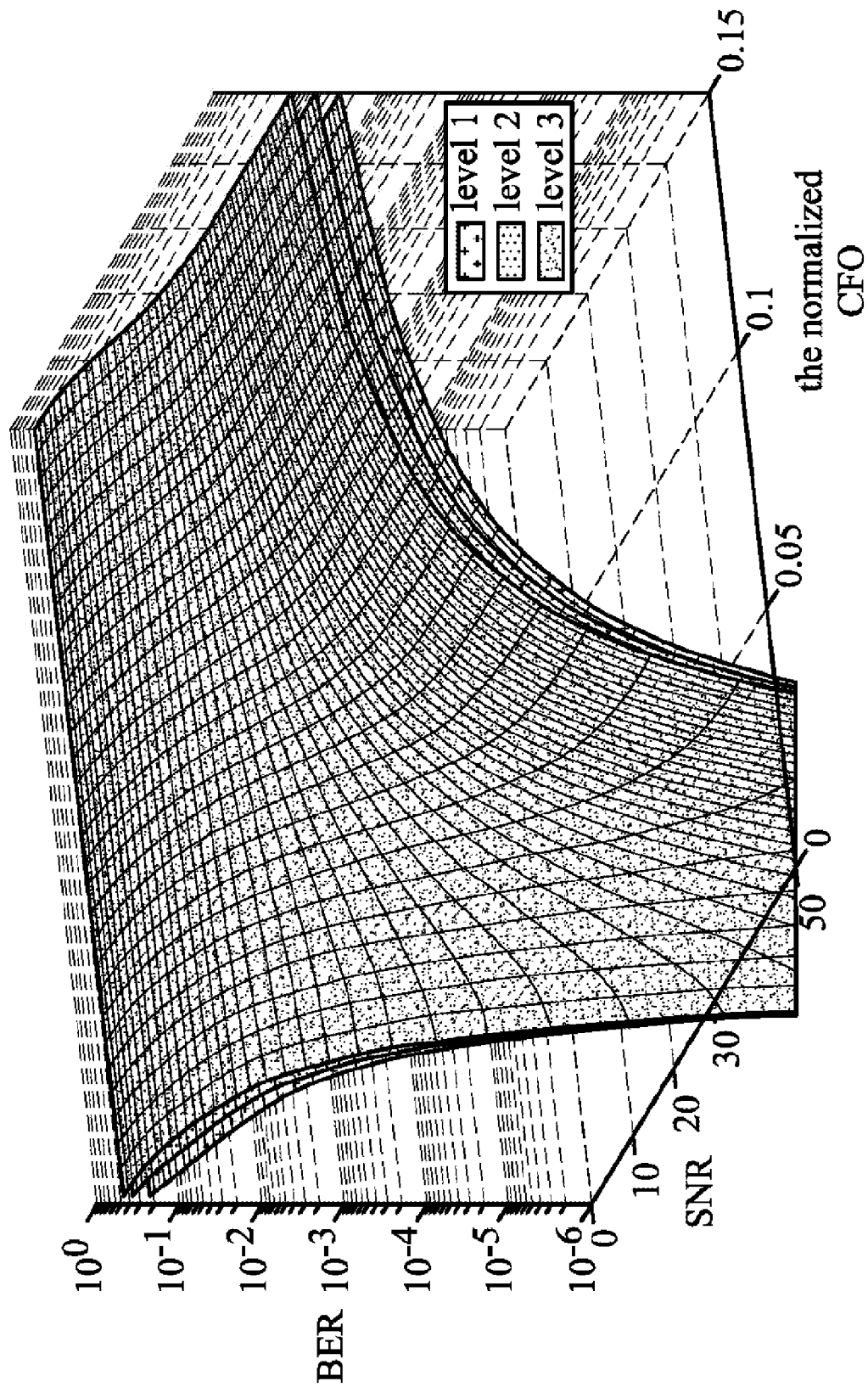
Figures 2, 4:
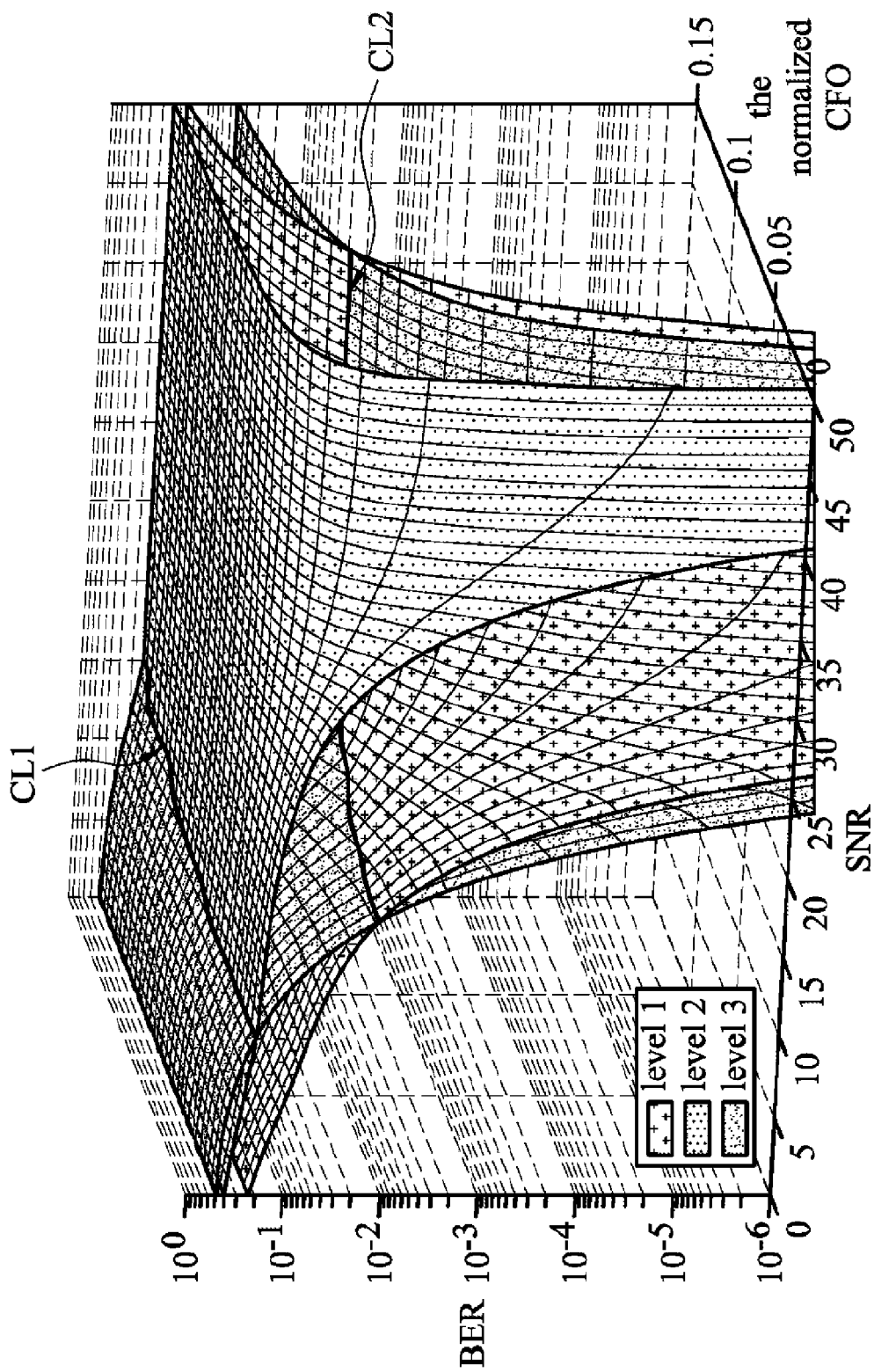
Figure 5:
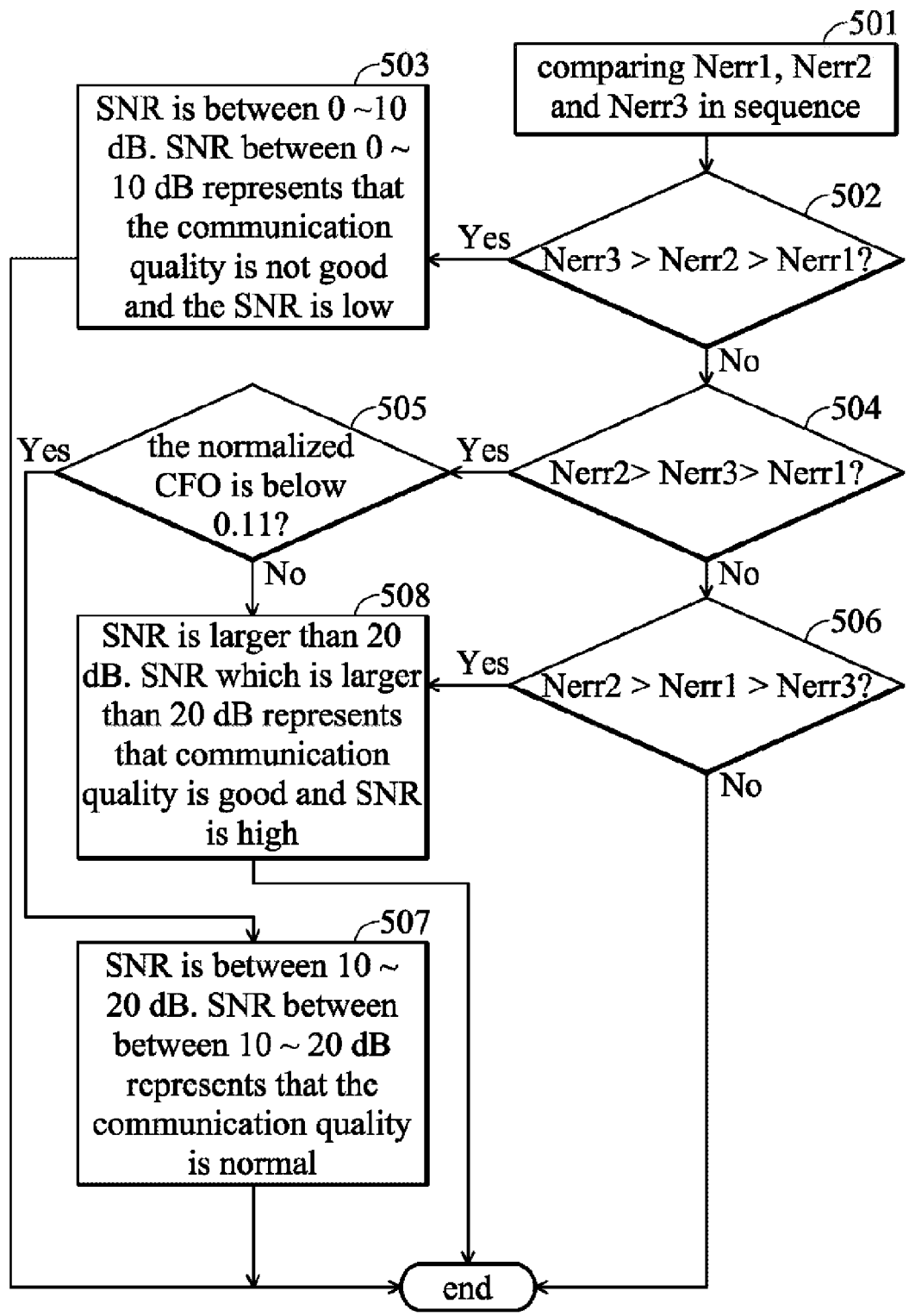
Figures 1, 6:
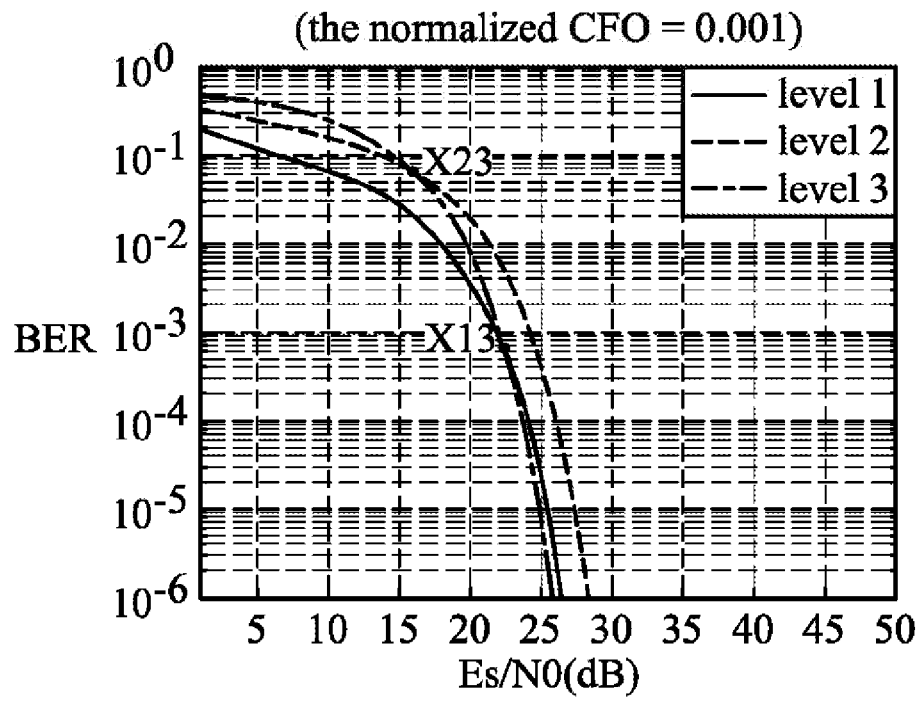
Figures 2, 6:
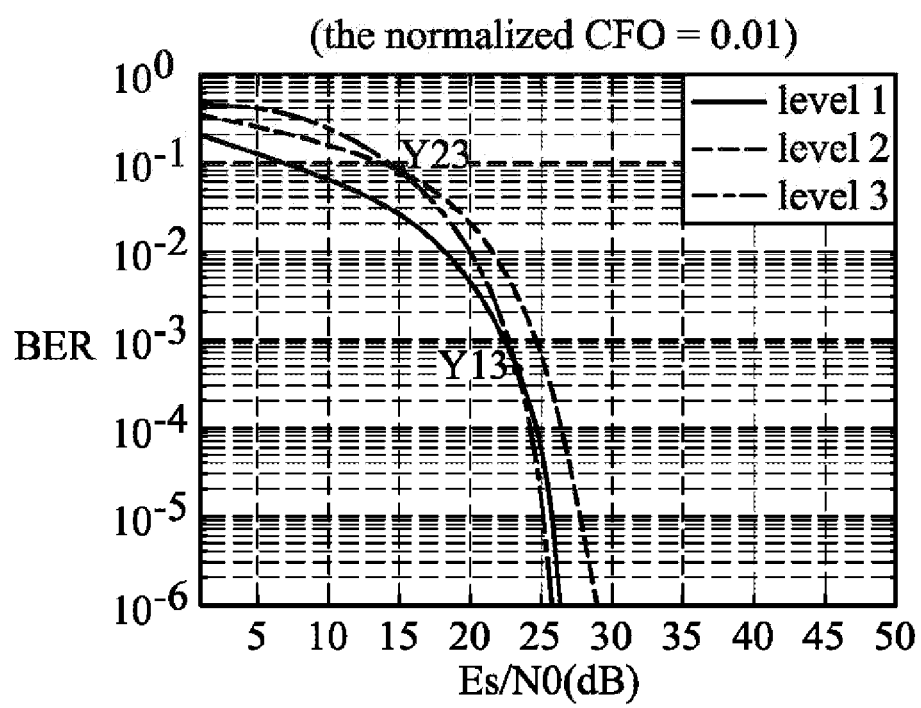
Figures 3, 6:
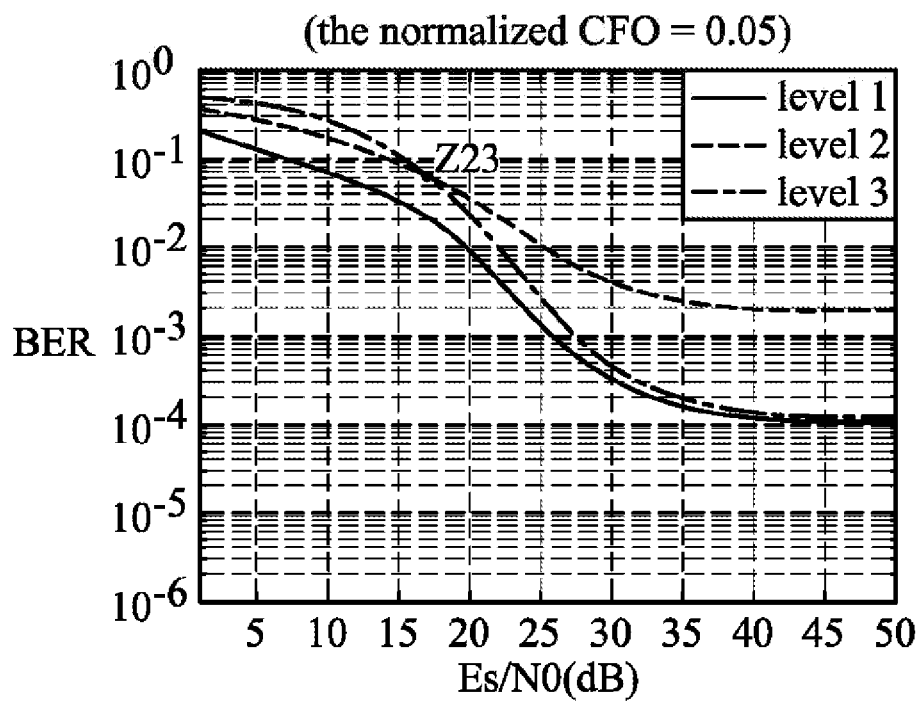
Figures 4, 6:
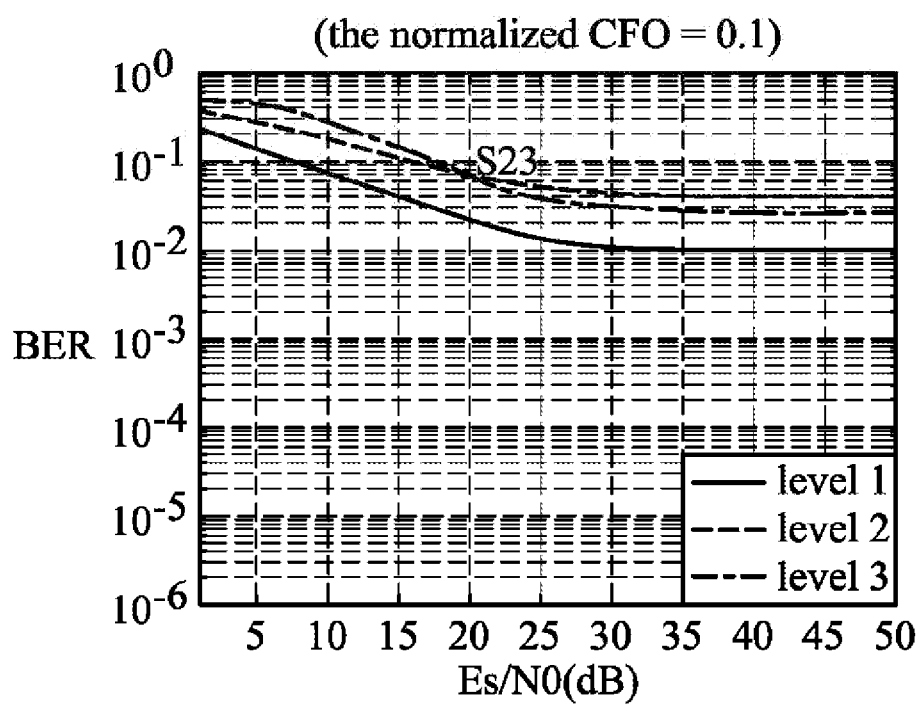
Figures 5, 6:
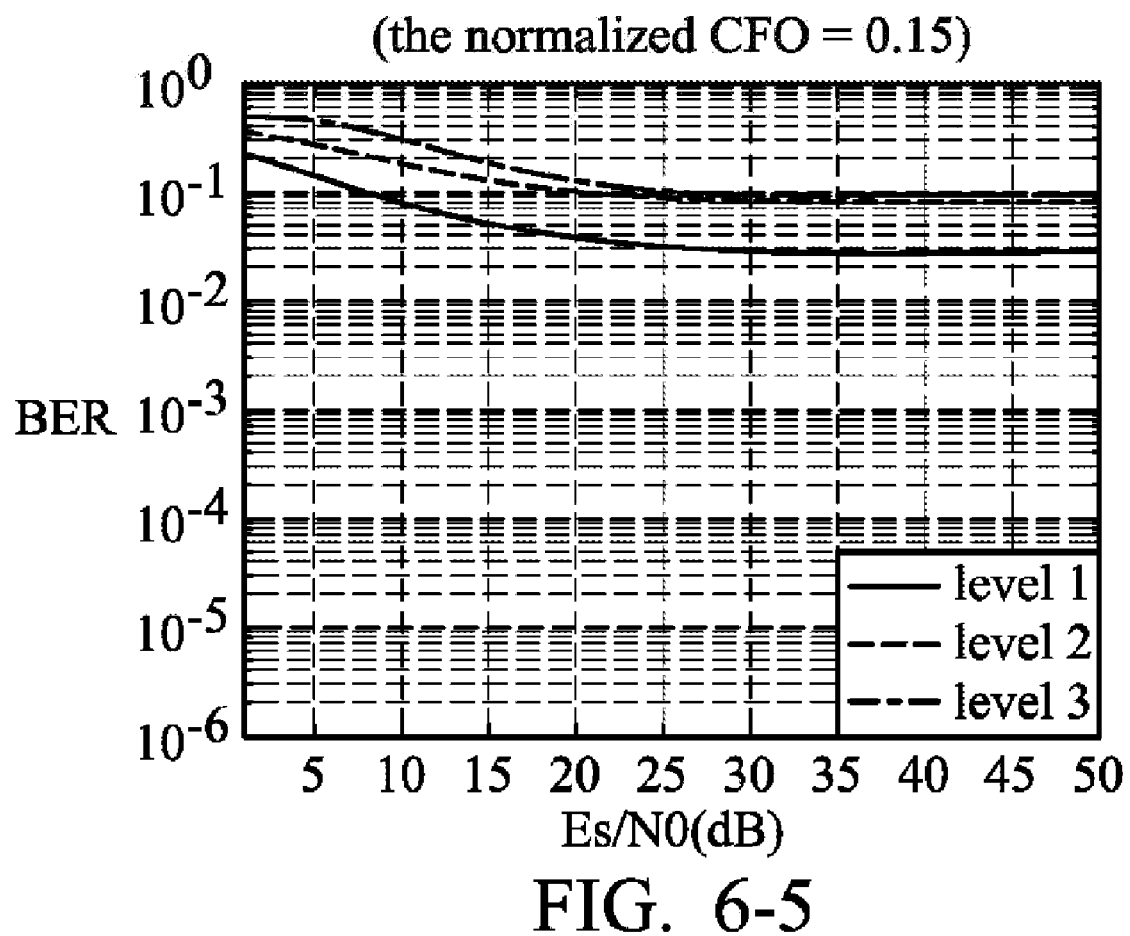

FIG. 5 is a flow chart for detecting the signal and noise ratio (SNR) according to an embodiment of the invention, wherein $\lambda_1$ is 1.6 and $\lambda_2$ is 1.4 in the non-uniform hierarchical 64-QAM constellation. In step 501, the bit error rate in the first level (represented as Nerr1), the bit error rate in the second level (represented as Nerr2) and the bit error rate in the third level (represented as Nerr3) in sequence are compared. The signal and noise ratio (SNR) between 0~10 dB shows that the communication quality is not good and the signal and noise ratio (SNR) is low (step 503) when the condition of "Nerr3>Nerr2>Nerr1" is sustained (step 502). However, when the condition of "Nerr3>Nerr2>Nerr1" is not sustained in step 502, the procedure goes to step 504. When the condition of "Nerr2>Nerr3>Nerr1" is sustained (step 504—YES) and the normalized frequency offset is below 0.11 (in step 505—YES), the signal and noise ratio (SNR) is between 10~20 dB and the signal and noise ratio (SNR) between 10~20 dB represents that the communication quality is normal. Then the procedure goes to step 509 and ends. On the contrary, the signal and noise ratio (SNR) is larger than 20 dB and the signal and noise ratio (SNR) which is larger than 20 dB shows that communication quality is good when the normalized frequency offset is not below 0.11 (step 505—NO). The procedure goes to step 509 and ends. However, when the condition of "Nerr2>Nerr3>Nerr1" is not sustained (step 504—NO), and the condition of "Nerr2>Nerr1>Nerr3" is sustained (step 506), the signal and noise ratio (SNR) is larger than 20 dB and the signal and noise ratio (SNR) which is larger than 20 dB represents good communication quality. The procedure goes to step 509 and ends there. The signal and noise ratio (SNR) is determined to obtain the communication quality according to the different property of bit error rates in three levels as shown in the FIG. 5.

Before the carrier frequency offset has been detected, it should be understood that the carrier frequency offset seriously affects the system performance in certain condition. FIGS. 6-1, 6-2, 6-3, 6-4 and 6-5 are the performance curves of bit error rate for each level according to an embodiment of the invention, wherein $\lambda_1$ is 1.6 and $\lambda_2$ is 1.4 in the non-uniform hierarchical 64-QAM constellation and the normalized frequency offset is 0.001, 0.01, 0.05, 0.1 or 0.15 in the FIGS. 6-1, 6-2, 6-3, 6-4 and 6-5.

According to FIGS. 6-1-6-5, the curve of each level corresponding to the signal and noise ratio (SNR) is obtained under the different normalized frequency offsets. When the signal and noise ratio (SNR) is low, the ICI caused by carrier frequency offset is not the major cause for the bit error rate of each level. However, the bit error rate of each level affected by carrier frequency offset can not follow the increasing signal and noise ratio (SNR) and decrease when the signal and noise ratio (SNR) is high. The error floor thus happens. The signal and noise ratio (SNR), and not ICI, is a major cause of affecting system performance when the signal and noise ratio (SNR) is low. On the contrary, the ICI, and not SNR, is a major cause of affecting system performance in the high signal and noise ratio (SNR). Even if the signal and noise ratio (SNR) is further increased, the error rate does not decrease due to carrier frequency offset. Therefore, detecting the carrier frequency offset accurately in the high signal and noise ratio (SNR) is more important than in the low signal and noise ratio (SNR). The carrier frequency offset caused by the Doppler effect is detected by the obtained different protection degree of each level using pilots which have been hierarchically modulated in this invention.

It is noted that a plurality of cross points are generated when the bit error rates in sequence of the levels are changed, and the plurality of cross points are cross positions between a plurality of performance curves of the bit error rates of the levels in different signal and noise ratio (SNR) under a condition of a fixed carrier frequency offset. For example, the performance curves of the first and third levels are crossed at the cross point X13 and the performance curves of the second and third levels are crossed at the cross point X23 when the normalized frequency offset is 0.001 as shown in the FIG. 6-1. In the FIG. 6-2, the performance curves of the first and third levels are crossed at the cross point Y13 and the performance curves of the second and third levels are crossed at the cross point Y23 when the normalized frequency offset is 0.01. In the FIG. 6-3, the performance curves of the second and third levels are only crossed at the cross point Z23 when the normalized frequency offset is 0.01. Therefore, the cross points are obtained because the property of the bit error rate in each level corresponds to the signal and noise ratio (SNR). As shown in FIG. 6-1, bit error rate of each level in sequence is Nerr3>Nerr2>Nerr1 (from large to small) before the cross point X23 appears. However, the bit error rate of each level in sequence is Nerr2>Nerr3>Nerr1 when the cross point X23 appears and the cross point X13 does not appear. The bit error rate of each level in sequence is Nerr2>Nerr1>Nerr3 when the cross point X13 appears. It should be noted that the cross points will appear when the bit error rates of the levels in sequence are changed. Therefore, using the order of the bit error rates at each level is the same method as using the characteristic of the cross points to detect the signal and noise ratio (SNR).

In addition, cross points are associated with carrier frequency offset according to FIG. 6-1-6-5. The number of cross points decreases when carrier frequency offset increases. Carrier frequency offset will change the bit error rate of each level in sequence, and the cross points will appear when the bit error rate of each level in sequence is changed. Thus, it can be understand that cross points are associated with carrier frequency offset.

A plurality of cross lines are generated by connecting the plurality of cross points under a condition of different carrier frequency offsets such as the cross lines CL1 and CL2 as shown in the FIG. 4-2. The plurality of cross lines are configured for tracking a variable velocity and an acceleration of a relative velocity between a transmitter and receiver and time trajectory description of Doppler effect.

Figure 7:
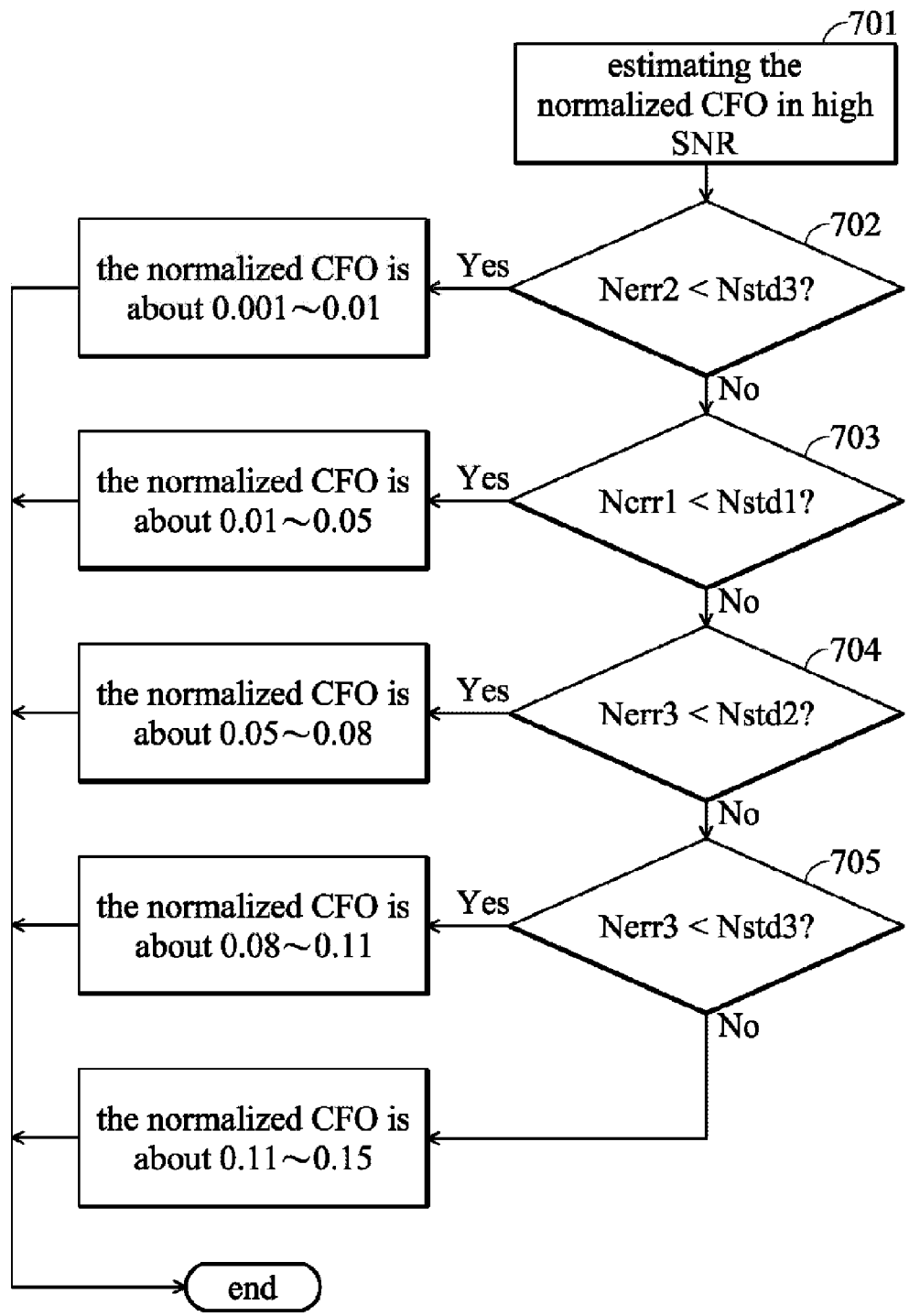
FIG. 7 is flow chart that shows the detection of carrier frequency offset according to an embodiment of the invention, wherein $\lambda_1$ is 1.6 and $\lambda_2$ is 1.4 in the non-uniform hierarchical 64-QAM constellation.

FIG. 7 is flow chart for detecting the carrier frequency offset according to an embodiment of the invention, wherein $\lambda_1$ is 1.6 and $\lambda_2$ is 1.4 in the non-uniform hierarchical 64-QAM constellation. When the signal and noise ratio (SNR) detected by the pilot signal analysis module 204 is high, the effect of the carrier frequency offset is important. It is assumed that there are three target decision bit error rates, Nstd1, Nstd2 and Nstd3 and Nstd1=$10^{-4}$, Nstd2=$10^{-3}$ and Nstd3=$10^{-2}$ respectively before the pilot signal analysis module 204 detects the carrier frequency offset. The detected carrier frequency offset is more accurate if the number of target decision bit error rates are increasing. However, three target decision bit error rates, Nstd1, Nstd2 and Nstd3 are used as an example herein.

According to the FIG. 6-1-6-5, there is an obvious difference between bit error rates of the levels affected by carrier frequency offset under $\lambda_1$=1.6 and $\lambda_2$=1.4 in the non-uniform hierarchical 64-QAM constellation. The flow chart begins in step 701. The detected normalized frequency offset is below 0.01 when the condition of "Nerr2<Nstd3" is sustained (step 702—YES). The flow chart ends. However, the flow chart goes to step 703 when the condition of "Nerr2<Nstd3" is not sustained in step 702—NO. Then, the detected normalized frequency offset is between 0.01~0.05 when the condition of "Nerr1<Nstd1" is sustained (step 703—YES). Then the flow chart ends. However, the flow chart goes to step 704 when the condition of "Nerr1<Nstd1" is not sustained in step 703—NO. Then, the detected normalized frequency offset is between 0.05~0.08 when the condition of "Nerr3<Nstd2" is sustained (step 704—YES). Then the flow chart ends. However, the flow chart goes to step 705 when the condition of "Nerr3<Nstd2" is not sustained in step 704—NO. Next, the detected normalized frequency offset is between 0.08~0.11 when the condition of "Nerr3<Nstd3" is sustained (step 705—YES). The flow chart will end. However, the detected normalized frequency offset is between 0.11~0.15 when any of the above conditions are not conformed in step 705—NO.

FIG. 7 mentions the rough carrier frequency offset detection. Carrier frequency offset is detected by comparing the relationship between the bit error rates of all levels, and the plurality of target decision bit error rates. In fact, bit error rates at each level under a certain carrier frequency offset are different such that carrier frequency offset is detected accurately by using the distance between the bit error rates of the levels. The flow chart in FIG. 7 does not limit the method of carrier frequency offset detection. Carrier frequency offset is determined and the flow chart can be adjusted according to the amount of the plurality of target decision bit error rates and the bit error rates of the levels such as four bit error rates of the four levels in the hierarchical 128-QAM constellation or five bit error rates of the five levels in the hierarchical 256-QAM constellation.

Figure 8:
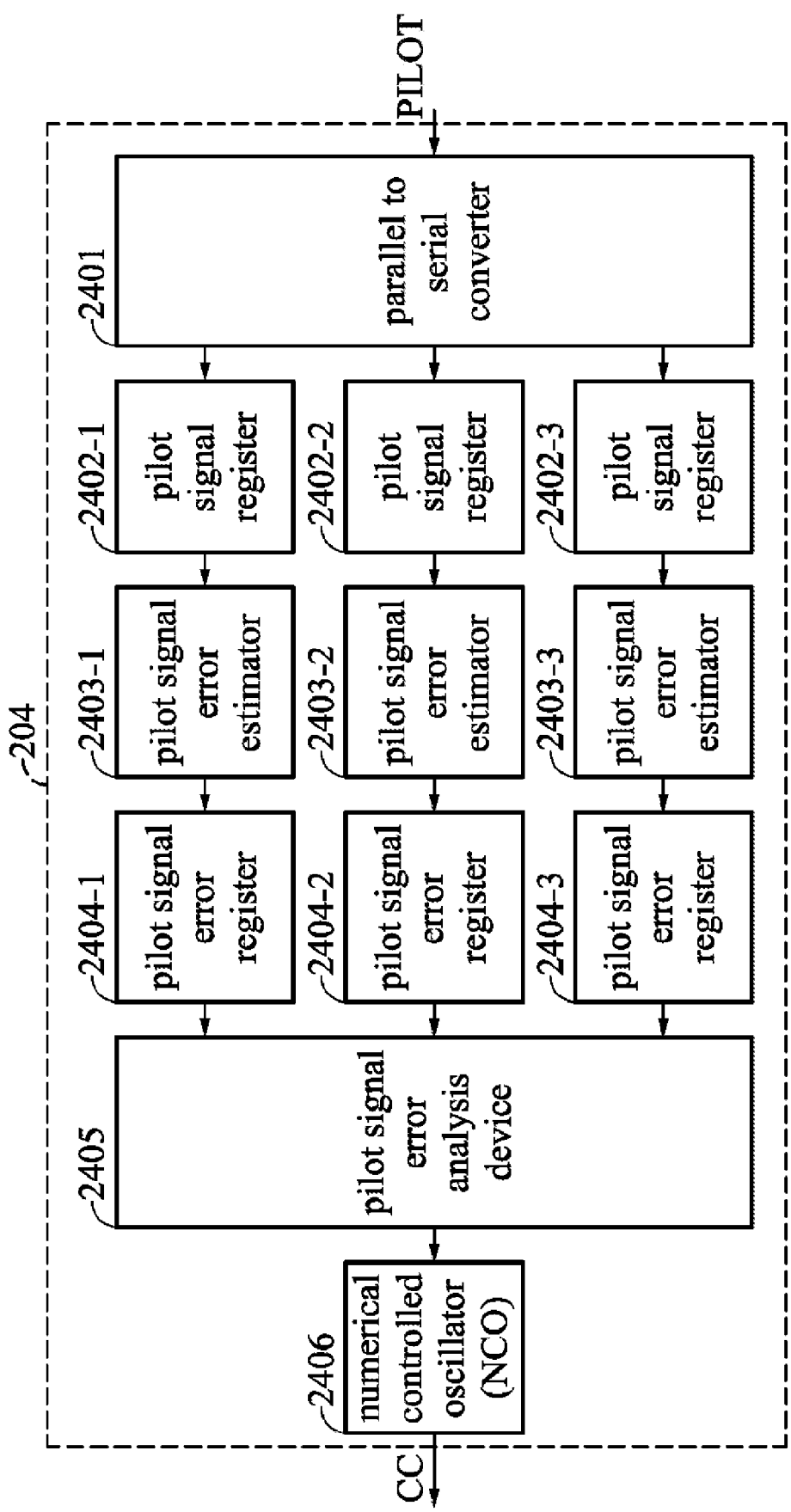
FIG. 8 is a block diagram illustrating the pilot signal analysis module 204 according to an embodiment of the invention.

FIG. 8 is a block diagram illustrating the pilot signal analysis module 204 (as shown in the FIG. 3) according to an embodiment of the invention. The pilot signal analysis module 204 comprises a parallel to serial converter 2401 for converting the demodulated processed pilots into a plurality of levels where one of the plurality of levels comprises a plurality of level bits and outputting the level bits to a plurality of pilot signal registers 2402. The plurality of pilot signal registers 2402 are configured for storing level bits of each level. For example, the pilot signal register 2402-1 stores the level bits of the first level, the pilot signal register 2402-2 stores the level bits of the second level and the pilot signal register 2402-3 stores the level bits of the third level in the hierarchical 64-QAM constellation. A plurality of pilot signal error estimators 2403 in the pilot signal analysis module 204 are configured for comparing each stored level bits in the pilot signal registers 2402 and the known level bits of each level of the pilots to obtain bit error rate of each level under different SNR. In other words, the pilot signal error estimator 2403-1 detects the difference between the stored level bits of the first level and the known level bits in the first level of the pilot. The pilot signal error estimator 2403-2 detects the difference between the stored level bits of the second level and the known level bits in the second level of the pilot. The pilot signal error estimator 2403-3 detects the difference between the stored level bits of the third level and the known level bits in the third level of the pilot. A plurality of pilot signal error registers 2404 are configured for storing the bit error rate of each level. In other words, pilot signal error register 2404-1 stores the bit error rate of the first level, and so on. A pilot signal error analysis device 2405 is configured for determining the signal and noise ratio or the channel quality according to bit error rates of levels in sequence as shown in the flow chart of the FIG. 5. Then the pilot signal error analysis device 2405 detects the rough carrier frequency offset according to the flow chart of carrier frequency offset detection as shown in the FIG. 7 when the signal and noise ratio is high or exceeds a predetermined value. Next, a numerical controlled oscillator (NCO) 2406 detects the fine carrier frequency offset to generate a carrier frequency offset compensation coefficient CC to the signal processing device 201.

This invention discloses that the original pilots in the OFDM system become hierarchically modulated pilots. In the receiver, carrier frequency offset caused by high speed is detected and signal and noise ratio (SNR) is determined by using the property of each hierarchical bit corresponding to the different carrier frequency offset. Thus, received signal strength indications (RSSI) for detecting the signal and noise ratio (SNR) are not needed.

With the examples and explanations given above, the features and spirit of the invention are well described. Those skilled in the art will readily observe that numerous modifications and alterations of the embodiments may be made while retaining the core concept of the invention. Accordingly, the above disclosure should be construed as limited only by the needs and bounds of the appended claims.

What is claimed is:

1. A receiver used for an orthogonal frequency-division multiplexing (OFDM) system, comprising:
   a signal processing device receiving an OFDM symbol and processing the OFDM symbol according to the OFDM symbol and a carrier frequency offset compensation coefficient to generate a processed signal, wherein the OFDM symbol comprises pilots which have been hierarchically modulated and the processed signal comprises processed pilots;
   a signal analysis device collecting the processed pilots of the processed signal and detecting a carrier frequency offset to generate the carrier frequency offset compensation coefficient to the signal processing device according to the processed pilots and a plurality of target decision bit error rates; and
   a channel detection module detecting a channel response of the processed signal according to the processed pilots and compensating the processed signal to generate an output data,
   wherein the signal processing device comprises
      a pilot signal collector collecting the processed pilots of the processed signal,
      a hierarchical pilot signal demodulator demodulating the processed pilots, and
      a pilot signal analysis module determining a signal and noise ratio according to the demodulated processed pilots, and detecting the carrier frequency offset to generate the carrier frequency offset compensation coefficient to the signal processing device according to the demodulated processed pilots and the target decision bit error rates when the signal and noise ratio exceeds a predetermined value.

2. The receiver of claim 1, wherein the pilot signal analysis device comprises:
   a parallel to serial converter converting the demodulated processed pilots into a plurality of levels where one of the plurality of levels comprises a plurality of level bits and outputting of the level bits in each of the plurality of levels;
   a pilot signal error detector detecting bit error rates of the levels; and
   a pilot signal error analysis device determining the signal and noise ratio according to the bit error rates in sequence, and detecting the carrier frequency offset to generate the carrier frequency offset compensation coefficient to the signal processing device according to the bit error rates and the plurality of target decision bit error rate in sequence when the signal and noise ratio exceeds a predetermined value.

3. The receiver of claim 1, wherein the processed pilots are demodulated according to a uniform hierarchical quadrature amplitude modulation (QAM) constellation by the hierarchical pilot signal demodulator.

4. The receiver of claim 3, wherein a distribution of a plurality of constellation points in the uniform hierarchical quadrature amplitude modulation (QAM) constellation is adjusted according to a plurality of hierarchical level distance ratios.

5. The receiver of claim 2, wherein the pilot signal analysis module further comprises a plurality of pilot signal registers for storing the level bits in each of the plurality of levels respectively.

6. The receiver of claim 2, wherein the pilot signal analysis module further comprises a plurality of pilot signal error registers for storing the bit error rates.

7. The receiver of claim 2, wherein the bit error rate comprises a first level bit error rate, a second level bit error rate and a third level bit error rate.

8. The receiver of claim 7, wherein the signal to noise ratio is determined according to the first level bit error rate, the second level bit error rate and the third level bit error rate in sequence, and the signal to noise ratio exceeding the predetermined value is determined when the second level bit error rate exceeds the first level bit error rate and the first level bit error rate exceeds the third level bit error rate.

9. The receiver of claim 8, wherein the bit error rates and the plurality of target decision bit error rate in sequence are determined when the signal to noise ratio exceeds the predetermined value, and the plurality of target decision bit error rates comprises a first target decision bit error rate, a second target decision bit error rate and a third target decision bit error rate.

10. The receiver of claim 9, wherein the carrier frequency offset compensation coefficient is between 0.001 and 0.01 when the signal to noise ratio exceeds the predetermined value and the second level bit error rate is smaller than the third target decision bit error rate.

11. The receiver of claim 9, wherein the carrier frequency offset compensation coefficient is between 0.01 and 0.05 when the signal to noise ratio exceeds the predetermined value and the first level bit error rate is smaller than the first target decision bit error rate.

12. The receiver of claim 9, wherein the carrier frequency offset compensation coefficient is between 0.05 and 0.08 when the signal to noise ratio exceeds the predetermined value and the third level bit error rate is smaller than the second target decision bit error rate.

13. The receiver of claim 9, wherein the carrier frequency offset compensation coefficient is between 0.08 and 0.11 when the signal to noise ratio exceeds the predetermined value and the third level bit error rate is smaller than the third target decision bit error rate.

14. The receiver of claim 9, wherein the carrier frequency offset compensation coefficient is between 0.11 and 0.15 when the signal to noise ratio exceeds the predetermined value and the third level bit error rate is not smaller than the third target decision bit error rate.

15. The receiver of claim 1, wherein the channel detection module further comprises a one-tap equalizer for compensating the channel response.

16. The receiver of claim 1, wherein the signal processing device further comprises a Fourier transform converter for transforming the OFDM symbol from time domain to frequency domain.

17. The receiver of claim 2, wherein a plurality of cross points are generated when the bit error rates in sequence of the levels are changed, and the plurality of cross points are cross positions between a plurality of performance curves of the bit error rates of the levels in different signal and noise ratio (SNR) under a condition of a fixed carrier frequency offset.

18. The receiver of claim 17, wherein a plurality of cross lines are generated by connecting the plurality of cross points under a condition of different carrier frequency offsets and the plurality of cross lines are configured for tracking a variable velocity and an acceleration of a relative velocity between a transmitter and receiver.

19. A method of carrier frequency offset detection used for an orthogonal frequency-division multiplexing (OFDM) system, comprising:
   modulating a plurality of pilots in an OFDM symbol hierarchically;

transmitting the OFDM symbol, wherein the OFDM symbol is affected by a carrier frequency offset;
processing the OFDM symbol according to the OFDM symbol and a carrier frequency offset compensation coefficient to generate a processed signal by a signal processing device, wherein the processed signal having processed pilots;
collecting the processed pilots of the processed signal;
detecting a channel response of the processed signal according to the processed pilots and compensating the processed signal to generate an output data;
demodulating the processed pilots to form demodulated processed pilots;
determining a signal and noise ratio according to the demodulated processed pilots; and
detecting carrier frequency offset to generate the carrier frequency offset compensation coefficient to the signal processing device according to the demodulated processed pilots and a plurality of target decision bit error rates when the signal and noise ratio exceeds a predetermined value.

20. The method of carrier frequency offset detection of claim 19, further comprising:
converting the demodulated processed pilots into a plurality of levels where one of the plurality of levels comprises a plurality of level bits;
detecting a plurality of bit error rates of the levels; and
determining a signal and noise ratio according to the bit error rates, and detecting the carrier frequency offset to generate the carrier frequency offset compensation coefficient to the signal processing device according to the bit error rate and the plurality of target decision bit error rate in sequence when the signal and noise ratio exceeds a predetermined value.

21. The method of carrier frequency offset detection of claim 19, wherein the processed pilots are demodulated according to an uniform hierarchical quadrature amplitude modulation (QAM) constellation by the hierarchical pilot signal demodulator.

22. The method of carrier frequency offset detection of claim 20, wherein a distribution of a plurality of constellation points in the uniform hierarchical quadrature amplitude modulation (QAM) constellation is adjusted according to a plurality of hierarchical level distance ratios.

23. The method of carrier frequency offset detection of claim 20, further comprising: storing the level bits and the bit error rate.

24. The method of carrier frequency offset detection of claim 20, wherein the bit error rates comprises a first level bit error rate, a second level bit error rate and a third level bit error rate.

25. The method of carrier frequency offset detection of claim 24, wherein the signal to noise ratio is determined according to the first level bit error rate, the second level bit error rate and the third level bit error rate in sequence, and wherein the signal to noise ratio is determined so that the signal to noise ratio exceeds the predetermined value when the second level bit error rate is larger than the first level bit error rate and the first level bit error rate is larger than the third level bit error rate.

26. The method of carrier frequency offset detection of claim 25, wherein the bit error rates and the plurality of target decision bit error rates in sequence are determined when the signal to noise ratio exceeds the predetermined value, and the plurality of target decision bit error rates comprises a first target decision bit error rate, a second target decision bit error rate and a third target decision bit error rate.

27. The method of carrier frequency offset detection of claim 26, wherein the carrier frequency offset compensation coefficient is between 0.001 and 0.01 when the signal to noise ratio exceeds the predetermined value and the second level bit error rate is smaller than the third target decision bit error rate.

28. The method of carrier frequency offset detection of claim 26, wherein the carrier frequency offset compensation coefficient is between 0.01 and 0.05 when the signal to noise ratio exceeds the predetermined value and the first level bit error rate is smaller than the first target decision bit error rate.

29. The method of carrier frequency offset detection of claim 26, wherein the carrier frequency offset compensation coefficient is between 0.05 and 0.08 when the signal to noise ratio exceeds the predetermined value and the third level bit error rate is smaller than the second target decision bit error rate.

30. The method of carrier frequency offset detection of claim 26, wherein the carrier frequency offset compensation coefficient is between 0.08 and 0.11 when the signal to noise ratio exceeds the predetermined value and the third level bit error rate is smaller than the third target decision bit error rate.

31. The method of carrier frequency offset detection of claim 26, wherein the carrier frequency offset compensation coefficient is between 0.11 and 0.15 when the signal to noise ratio exceeds the predetermined value and the third level bit error rate is not smaller than the third target decision bit error rate.

32. The method of carrier frequency offset detection of claim 19, further comprising detecting a channel response of the processed signal according to the processed pilots and compensating the processed signal to generate an output data.

33. The method of carrier frequency offset detection of claim 19, further comprising transforming the OFDM symbol from time domain to frequency domain.

34. The method of carrier frequency offset detection of claim 20, wherein a plurality of cross points are generated when the bit error rates in sequence of the levels are changed, and the plurality of cross points are cross positions between a plurality of performance curves of the bit error rates of the levels in different signal and noise ratio (SNR) under a condition of a fixed carrier frequency offset.

35. The method of carrier frequency offset detection of claim 34, wherein a plurality of cross lines are generated by connecting the plurality of cross points under a condition of different carrier frequency offsets and the plurality of cross lines are configured for tracking a variable velocity and an acceleration of a relative velocity between a transmitter and receiver.

* * * * *